May 7, 1968  E. SANTINELLI  3,381,356
APPARATUS FOR SUPPORTING ROTARY WORK HOLDER
Filed April 27, 1966  3 Sheets-Sheet 1
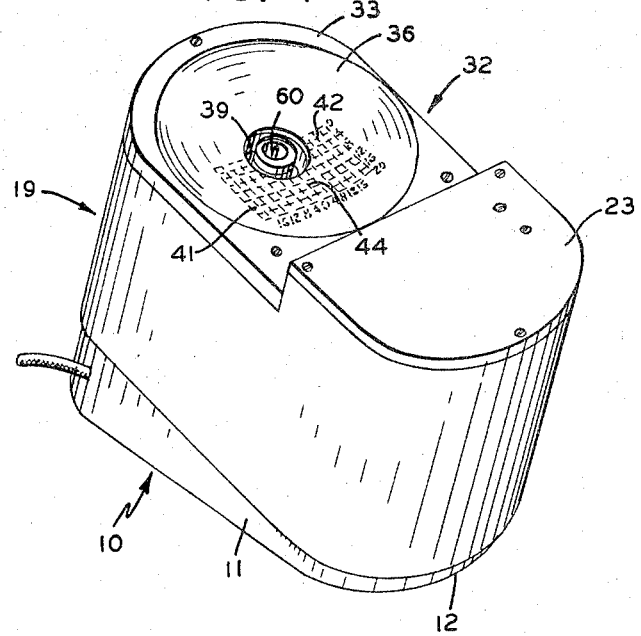
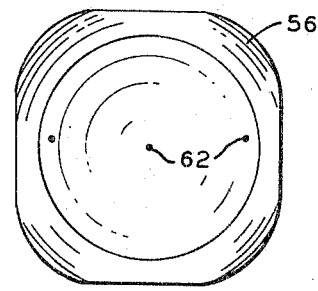
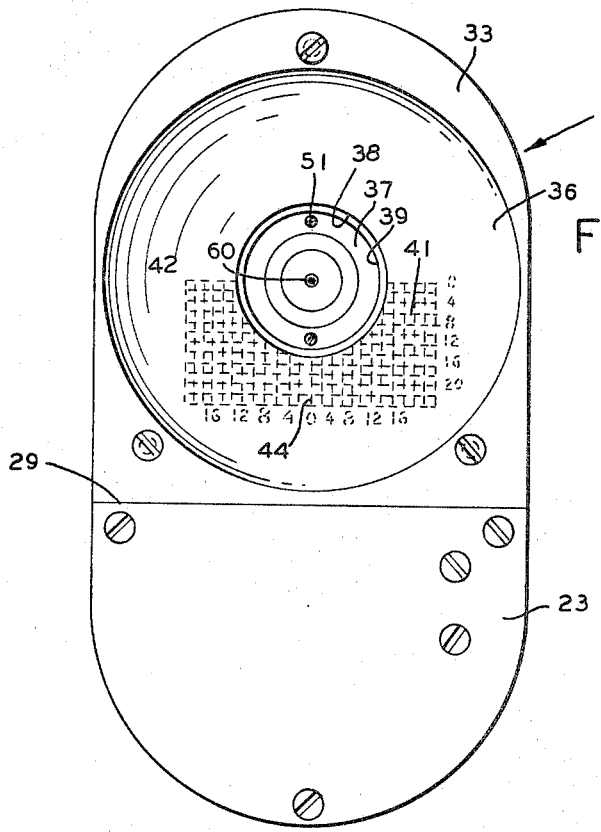
*INVENTOR.*
EMIL SANTINELLI
BY
JOHN P. CHANDLER
HIS ATTORNEY.

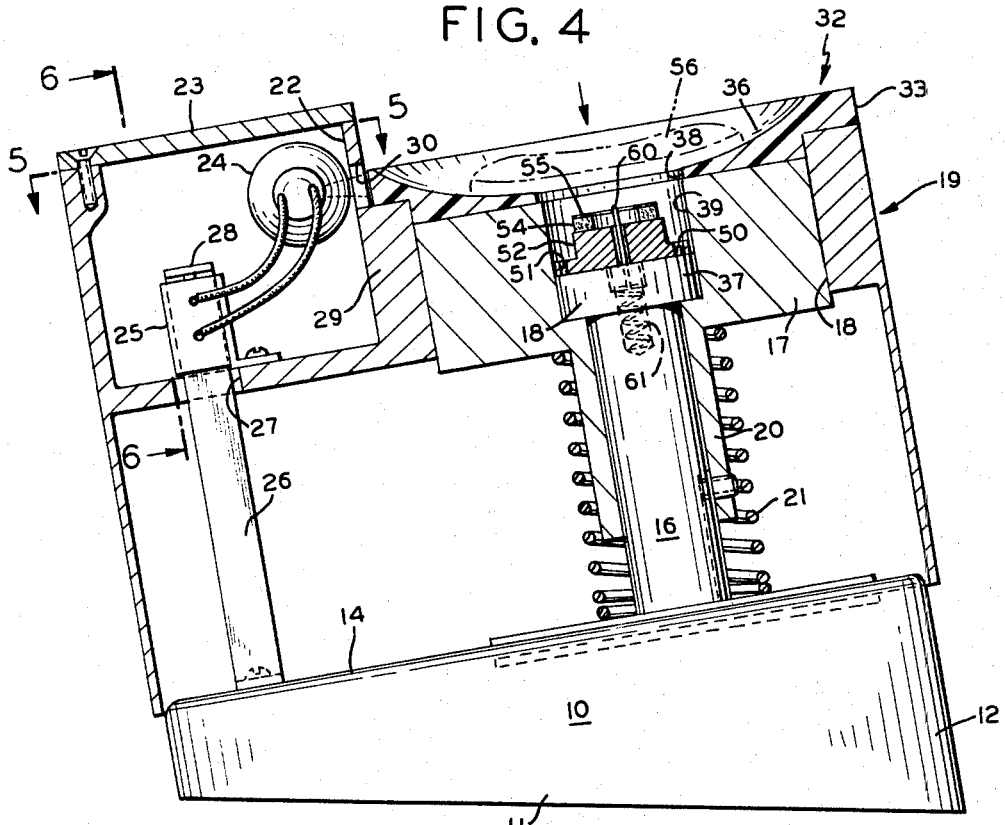
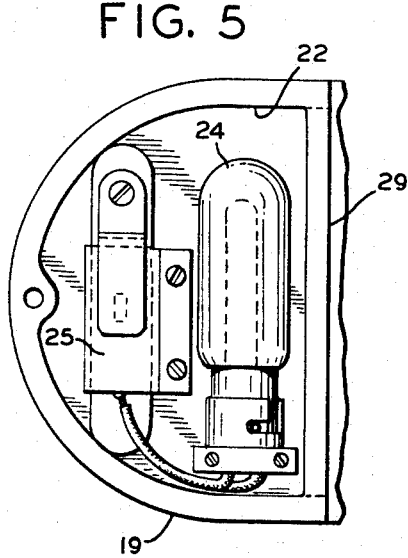
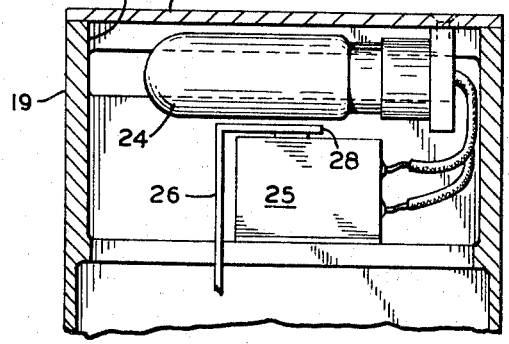

May 7, 1968  E. SANTINELLI  3,381,356
APPARATUS FOR SUPPORTING ROTARY WORK HOLDER
Filed April 27, 1966  3 Sheets-Sheet 3

INVENTOR.
EMIL SANTINELLI
BY
JOHN P. CHANDLER
HIS ATTORNEY

United States Patent Office 3,381,356
Patented May 7, 1968

3,381,356
APPARATUS FOR SUPPORTING ROTARY
WORK HOLDER
Emil Santinelli, R.F.D. 3, Horse Pound Road,
Carmel, N.Y. 10512
Filed Apr. 27, 1966, Ser. No. 551,831
5 Claims. (Cl. 29—200)

This invention relates to an apparatus for mounting optical lenses in perfect register on a rotatable support or chuck prior to an edge grinding operation.

After a lens blank has been optically ground, it is operated on by an edge grinder which removes the surplus material around the edges and cuts it to the precise size and shape to be received in a particular spectacle frame. A cam is employed in the edge grinder for guiding the grinding wheel and the operation is generally completed in a single revolution.

Prior to securing the lens on a chuck or rotary work holder, it is placed in a machine which determines the optical center as well as the axis line in the case of a cylindrical lens. Machines performing this essential operation are readily available, one of which bears the trademark "Lensometer" and they have means for printing three dots in a straight line on the lens, the central one of which defines the optical center and the three dots, taken together, define the horizontal axis line.

The apparatus of the present invention enables the lens blank to be securely mounted in precise position on the work holder and it has a scale with vertical and horizontal lines and an axis line is optically aligned with the uppermost one of the latter and the dot at the optical center is placed so as to coincide with the central vertical line, in most cases. In certain instances, particularly with bifocal lens, the axis line may, in accordance with the prescription, be located below the optical center and the latter may also be shifted to one side or the other of the center of the scale.

The principal difficulty in this operation results when, for one reason or another, the machine for shaping the edges of the lens fails to remove enough material. If the machine cuts too much material, the lens must be discarded but if not enough is removed, and the lens is too large, and the shape is not quite correct for the spectacle frame opening, it must be returned to the edge grinder for a second pass. If the lens has been removed from its precise position on the chuck following the first grinding operation, it can never be returned to its exact position and with existing apparatus and systems, the lens must be discarded and losses run high.

An important object of the present invention is to provide a combination of apparatus and rotary work support used therein for mounting the lens which enables the lens to be accurately positioned thereon with reference to the optical center and axis line and to fixedly remain in this position as a result of an adhesive attachment to the seat of the work holder until the lens has achieved the precise size and shape for the frame. In this fashion, the lens, still fixedly supported on the chuck can be applied to the frame after the first grinding operation and if it fits, the lens is stripped from its adhesive seat or the work holder and mounted in the frame.

More likely than not the lens is a bit too large and many craftsmen prefer to do the final cutting by degrees to prevent overcutting. In any event, the apparatus of the present invention eliminates one of the principal time consuming operations, namely removal by hand of the surplus edging which is often resorted to. The amount to be removed may be only a few thousands but holding the lens by hand against the grinding wheel is difficult and time consuming. The system of the present invention eliminates clamps for lining up the lens by hand and locates the optical center with greater precision than has been possible heretofore.

In the drawings:

FIG. 1 is a perspective view of the apparatus of the present invention;

FIG. 2 is a plan view of the lens blank constituting the workpiece and showing the optical markings thereon;

FIG. 3 is a plan view of the apparatus;

FIG. 4 is a central section taken through the apparatus;

FIG. 5 is a plan view of the forward end of the head of the apparatus with the cover plate removed;

FIG. 6 is a vertical section through this end;

Figure 7:
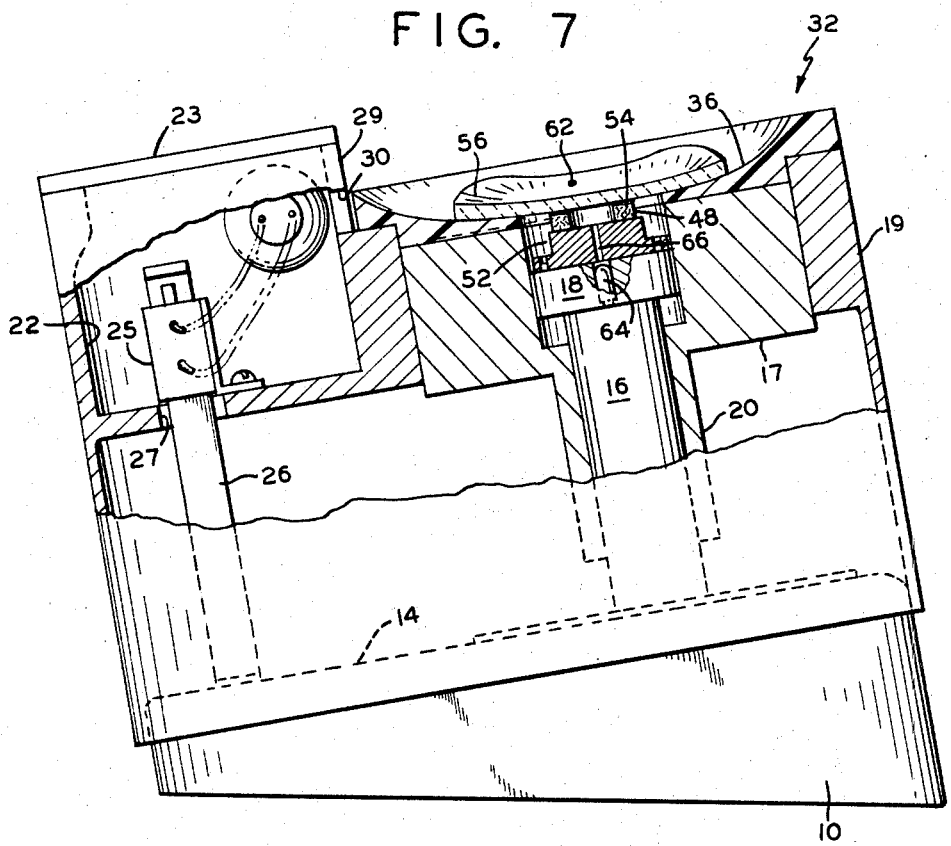
FIG. 7 is similar to FIG. 4 but shows the relation of the parts at the moment of adhesive contact between lens and work holder and also shows a modification.
Figure 8:
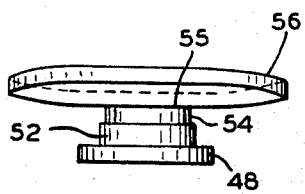
FIG. 8 is a side elevation of the rotary work holder with the lens mounted thereon.

The apparatus of the present invention includes a base 10 formed with straight sides 11 and rounded ends 12 and whose upper face 14 is inclined downwardly towards the worker who stands in front of the apparatus. A post 16 of substantial diameter is fixedly mounted towards the rear of the base and is disposed at an angle normal to the upper face 14 of the base. A circular cup 17 is rigidly mounted within a circular opening 18 in a depressible head 19 and the cup is formed at its lower end with a sleeve 20 which is carried on the post for free sliding movement and by making the diameter of the sleeve and post large enough (about 1″) this free sliding movement is assured even if only one side of the head is pressed downwardly. A spring 21 urges the cup and head upwardly.

The head is of the same general shape as the base and at its forward end there is an opening 22 which is closed by a plate 23. This forward section of the head encloses a light 24 and a normally open switch 25 which is adapted to be closed when the head is depressed. A bracket 26 mounted on the base 10 extends upwardly through an opening 27 and has a right angular extension 28 on which the switch is mounted.

At the forward end of opening 22, there is a shallow wall section 29 with a slit 30 at its lower edge permitting the light to shine rearwardly. The circular opening 18 at the rearward end of the head is closed by a plate 32 of special configuration and preferably molded from clear transparent plastic material. Margin 33 of this plate overlays the upper edge of the head and the plate has a downwardly recessed circular area 36 and a central opening 38 aligned with a central opening 39 in cup 17. A seat 37 is formed at the upper end of post 16 and the recessed circular opening 36 provides a concave seat to receive the lens. On the lower face of this recessed section is inscribed a scale 41 laid out by a plurality of vertical and horizontal lines into millimeter squares and including an upper horizontal reference line 42 passing through the precise center of seat 18 and cup opening 39. There is also a central vertical reference line 44.

A chuck or rotary work holder 48 is received on seat 37 and it has a circular base section of a diameter as to fit snugly within cup opening 39 and this base section has two opposed indexing holes 50 which receive similarly related fixed indexing pins 51 on seat 37. There is also a central, raised chuck section or seat 52 having a gasket 54 formed of cork or other material cemented thereto and on this upper face a layer of adhesive 55 is applied to secure the lens 56 in centered relation.

Seat 37 also has a central bore normal to its face in which is mounted an indexing pin 60 which is mounted for limited sliding movement and is urged upwardly by a spring 61.

While the head is in its normal uppermost position, the light circuit is open and the rotary work holder is now placed on seat 37 with its indexing pins 51 passing through indexing holes 50. The lens 56 is now placed on the concave seat 36 and the head is depressed enough to close the light circuit and also to cause the upper end of indexing pin 60 to lightly contact the lower face of the lens. The lens has the usual three dots 62 printed thereon by the "Lensometer," the central one of which indicates the optical center and this must coincide with vertical indexing pin 60. The lens must now be rotated to cause the two other dots to coincide with horizontal reference line 42 on the scale. If the prescription calls for a different setting on the scale, the lens is moved appropriately. With the lens now accurately positioned, the head is moved downwardly a second increment until the lens contacts the adhesive face of the resilient gasket carried on the chuck. The lens is pressed downwardly against the gasket firmly enough to assure good contact and the chuck with the lens attached is now transferred to the machine for grinding and shaping the edge. This grinding operation is usually performed in one revolution of the lens and the lens with chuck attached is now removed and the lens applied to the spectacle frame to determine if the contour and size is precisely correct. If so, the lens may be stripped from its adhesive seat and the lens mounted in the frame. More often than not, however, the lens may be a trifle too large so the lens-chuck combination is returned to the lens grinder for removing the excess.

FIG. 7 also shows a slight modification wherein, instead of the depressible pin for locating the optical center, a beam of light from a light source 64 passes up through a vertical opening 66 in seat 18.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

The embodiments of the invention in which an exclusive property or privilege is claimed are defined as follows:

1. An apparatus for supporting a rotary work holder while a spectacle lens is adhesively mounted thereon in accurate registry relative to markings indicating the axis and optical center of the lens and wherein the work holder is provided with a base having indexing means, and a raised seat with an adhesive coating for securing the lens while work is performed thereon, said apparatus including a base provided with a vertical post, and a head provided with a sleeve mounted on the post for vertical sliding movement of the head, a seat for the work holder at the upper end of the post and provided with means cooperating with indexing means on the work holder and with further indexing means at the center of the seat to coincide with the optical center of the lens, a closure plate on the head provided with a scale with crossing reference lines passing through said indexing means at the center of the seat and having a central opening aligned with the work holder seat to permit the work holder to pass therethrough.

2. The structure of claim 1 wherein illuminating means for the scale and reference marks on the lens are disposed in the head.

3. The structure of claim 1 wherein the indexing means at the center of the seat is a depressible pin mounted for sliding movement in a direction normal to the face of the seat.

4. The structure of claim 1 wherein the indexing means at the center of the seat is a light source.

5. The combination of a rotary work holder provided with a base, an adhesive seat and indexing means, and an apparatus for supporting said rotary work holder while a spectacle lens is adhesively mounted thereon in accurate registry relative to markings indicating the axis and optical center of the lens, said work holder being provided with a base having indexing means, and a raised seat with an adhesive coating for securing the lens while a shaping operation is performed thereon, said apparatus including a base provided with a vertical post, and a head provided with a sleeve fixed therein and mounted on the post for vertical sliding movement of the head, a seat for the work holder at the upper end of the post and provided with means cooperating with said indexing means on the work holder and with further indexing means at the center of the seat to coincide with the optical center of the lens, a closure plate on the head provided with a scale with crossing reference lines passing through said indexing means at the center of the seat and having a central opening aligned with the work holder seat to permit the work holder to pass therethrough.

References Cited

UNITED STATES PATENTS

| | | | |
|---|---|---|---|
| 1,605,519 | 11/1926 | Day. | |
| 2,306,461 | 12/1942 | Miller. | |
| 2,624,107 | 1/1953 | Carpenter. | |
| 2,975,662 | 3/1961 | Courtot. | |
| 3,140,568 | 7/1964 | Beasley | 51—216 |
| 3,330,331 | 7/1967 | Duckwall et al. | 51—216 |
| 3,331,119 | 7/1967 | Gingell et al. | 29—407 |

THOMAS H. EAGER, *Primary Examiner.*